United States Patent Office 3,106,968
Patented Oct. 15, 1963

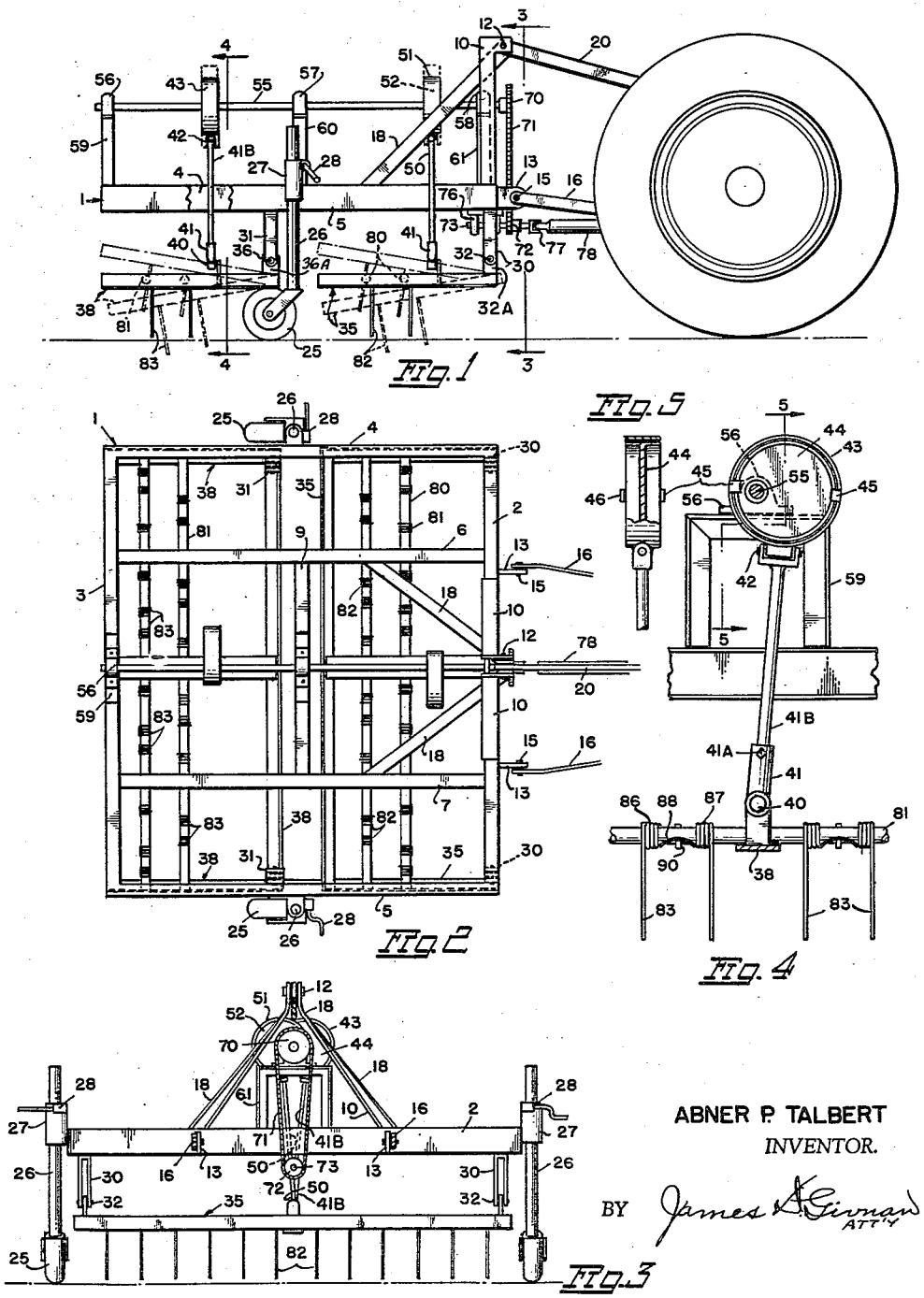
ABNER P. TALBERT
INVENTOR.

3,106,968
COMBINATION WEEDING AND CULTIVATING
ATTACHMENT FOR A TOWING VEHICLE
Abner P. Talbert, Rte. 2, Box 40, Ridgefield, Wash.
Filed Apr. 18, 1960, Ser. No. 22,751
2 Claims. (Cl. 172—78)

This invention relates to improvements in farming implements of the type shown and described in my United States Patent No. 2,935,140, dated May 3, 1960. More particularly the invention relates to improvements in an attachment for a tractor or other suitable towing vehicle and operated by a power take-off shaft of the tractor to extirpate weeds and the like between row crops as well as between the crops themselves.

One of the principal objects of the invention is to provide an attachment of the character described adapted for direct connection to the power take-off shaft of a tractor and wherein two tandem raking frames are hingedly attached at their forward end to a wheel supported main frame and each is provided with tines for progressive intermittent penetration into and withdrawal from the ground at intervals, the spacing and frequency of which are variable as determined by the speed of travel of the towing vehicle and/or the revolutions per minute of its power take-off shaft.

Another object of the invention is the provision of an implement of the character described which can be conveniently connected to the draw bar and implement-lifting instrumentalities of a tractor for raising and lowering the implement relative to the ground.

The foregoing and other objects and advantages which will become subsequently apparent reside in the details of construction and operation as more fully hereinafter described and claimed, reference being had to the accompanying drawing forming a part hereof and in which:

FIGURE 1 is a side elevational view of the invention shown attached to a towing vehicle and with a fragment broken away for convenience of illustration.

FIGURE 2 is a fragmentary top plan view of the invention.

FIGURE 3 is a sectional end elevational view taken approximating along the line 3—3 of FIGURE 1.

FIGURE 4 is a similar view on an enlarged scale taken along the line 4—4 of FIGURE 1, and FIGURE 5 is a sectional detail view taken approximately along the line 5—5 of FIGURE 4.

With continuing reference to the drawing wherein like references of character designate like parts, reference numeral 1 indicates generally a main frame comprising parallel front and rear members 2 and 3 interconnected at their ends by side members 4 and 5 and intermediate their ends by parallel members 6 and 7 interconnected by a cross member 9.

Secured to the front frame member 2 centrally thereof is a pair of upwardly converging braces 10 united by a pin 12 with the top forward ends of a pair of rearwardly and downwardly diverging braces 18, secured to the frame members 6 and 7. A pair of brackets 13 extend forwardly from the front frame member 4 for pivotal attachment, as at 15, to the rearward end of a pair of lifting arms 16, which are standard equipment on conventional tractors and cooperate with a similar arm 20 whose forward end is connected to the tractor and whose rearward end is connected by the pin 12 to the point of convergence of the two pairs of braces 10 and 18.

The main frame 1 is provided with vertically adjustable ground-engaging caster wheels 25 each carried by a shaft 26 slidably mounted in a sleeve 27 secured to the side frame members 4 and 5. The shafts 26 are lockable in vertically adjustable positions relative to the sleeves by a suitable locking mechanism 28.

Secured to and depending from the underside of the main frame 1 are a pair of forward brackets 30 and a pair of rearward brackets 31. A forward raking frame 35 has rigidly secured to its top forward end a pair of upwardly extending arms 32A hingedly attached as at 32 to the bottom end of the forward brackets 30. A rearward raking frame 38 is similarly provided at its forward end with vertical arms 36A hingedly attached as at 36 to the bottom end of the rear brackets 31, and, as clearly shown in FIGURE 1, the distance between these hinged attachments 32 and 36 and the top of their respective raking frames is greater than the thickness of the side members of the raking frames. Pivotally attached as at 40 to the rearward raking frame 38 (see FIGURE 4) is a socket 41 into which is adjustably secured by a set screw 41A, or the like, the bottom end of a connecting rod 41B whose top end is hingedly attached, as at 42, to a cam follower in the form of a ring 43 surrounding a cam 44 and held in position thereon by two pairs of inwardly turned ears 45 and 46. The forward raking frame is similarly connected by a connecting rod 50 to a cam follower ring 51 surrounding a cam 52. Both cams 44 and 52 are secured to a shaft 55 journalled in bearings 56, 57 and 58 mounted upon suitable vertical supports 59, 60 and 61 superimposed upon the main frame 1. It will be noted in FIGURES 2 and 3 that the lobe portions of the cams 44 and 52 are at all times diametrically opposed about the shaft 55, this not only imparts alternate swinging movement to the raking frames in a vertical plane but also balances the movement of one frame against the movement of the other. The relationship between the raking frames and their respective connecting rods 50 and 41B is such that the respective cams 52 and 44 are at a mid-point between their highest and lowest positions when the raking frames are horizontal to the ground. The connecting rods are of sufficient length to drive the raking frames below a horizontal position to impart the important forward rocking motion to the latter.

The forward end of the shaft 55 is provided with a sprocket wheel 70 driven by a chain 71 entrained thereover and over a driving sprocket 72 (see FIGURE 3) secured to a shaft 73 journalled in bearings 76 and provided at its forward end with a universal joint 77 by means of which it is operatively connected to the power take-off shaft 78 of a towing vehicle, such as a tractor or the like.

The forward and rearward raking frames 35 and 38 are provided with parallel cross members 80 and 81, respectively, and each cross member is provided with raking members 82 and 83, respectively, each of which comprises a single length of wire wrapped about its respective support cross member in two different directions, as at 86 and 87, to provide a looped intermediate portion 88 through which a fastening element 90 extends for securing the raking member to its respective supporting member.

With the implement in the wheel-supported position shown in FIGURE 1, and both raking frames 35 and 38 in a horizontal position relative to the ground, power transmitted from the power take-off shaft 78 of the tractor through sprockets 72 and 70, cam shaft 55, cams 44 and 52, their respective followers 43 and 51, and connecting rods 41B and 50, will, because of the length of the connecting rods as above pointed out, impart upward and downward swinging movement to the free rearward ends of both raking frames in a vertical plane as indicated by broken and dotted lines. Such upward and downward swinging movement of the raking frames 35 and 38 and rearward and forward swinging motion of their respective vertical arms 32A and 36A, will also impart rocking motion to the raking frames rigidly secured to the bottom end of those arms. Such downward and rocking motion of both raking frames will cause their respective tines 82 and 83 to penetrate the ground and to be tilted forwardly during forward travel of the machine with a digging and weed-removing prying action. The frequency of tine penetration and removal is governed by the speed of rotation of the power take-off shaft 78 whether the tractor is at a standstill or in forward motion, and the speed of forward motion will govern the progressive spaced intervals at which tine penetration will occur. The forward travel of the implement and the forward rocking motion of both frames will cause their respective tines to exert a forward prying action while in the ground.

As best shown in FIGURE 2, the tines in one transverse row are staggered relative to those in a following row to thereby produce a raking action substantially over the entire area defined by the main frame 1. The flexibility of the tines is such that they will extirpate the relatively short and weak weed roots without damaging the longer and sturdier roots of row crops such as strawberries and the like. The depth of tine penetration can be controlled by adjusting the effective length of the connecting rods 41B and 50 through the medium of the sockets 41 and screws 41A. Through this same medium the operational relationship of one raking frame to the other can be varied from simultaneous to alternate upward and downward movement. Regardless of such relationship, however, the length of the connecting rods is sufficient as aforesaid, to drive the raking frames below a horizontal position to cause penetration of the tines and forward tilting of the same as the machine travels in a forward direction.

While I have shown and described a particular form of embodiment of my invention, I am aware that many minor changes therein will readily suggest themselves to others skilled in the art without departing from the spirit and scope of the invention. Having thus described my invention what I claim as new and desire to protect by Letters Patent is:

1. A farming implement of the character described comprising,
   a wheel-supported main frame,
   means for attaching the main frame to a towing vehicle for forward travel therewith and for raising and lowering said main frame relative to the ground in a horizontal plane,
   a first raking frame disposed below the main frame,
   means hingedly attaching said raking frame at its forward end of the main frame,
   a second raking frame disposed below the main frame,
   means hingedly attaching said second raking frame at its forward end to the main frame rearwardly of said first raking frame,
   both of said first and second raking frames having length, width and thickness, and said hinged attachments thereof elevated from the forward end of their respective raking frames a distance greater than the thickness of the frames,
   power transmisison means mounted upon the main frame and adapted to be driven by a power take-off of a towing vehicle,
   a plurality of tines secured to and depending from said first and second raking frames,
   a cam shaft,
   means operatively connecting the cam shaft to said power transmission means,
   cam means carried by and rotatable with said cam shaft,
   connecting rods operatively interconnecting said cam means and said first and second raking frames,
   said cam means being normally at a mid-point between their highest and lowest operative positions when said raking frames are horizontal to the ground,
   said connecting rods being of sufficient length to drive the raking frames below a horizontal position upon operation of said cam means to impart forward rocking motion to the raking frames and thereby intermittent progressive penetration of said tines into the ground and a forward tilting motion thereto during such penetration while the implement is in forward motion.

2. A farming implement of the character described comprising,
   a wheel-supported main frame,
   means for attaching the main frame to a towing vehicle for forward travel therewith and for raising and lowering said main frame relative to the ground in a horizontal plane,
   a first raking frame disposed below the main frame,
   means hingedly attaching said raking frame at its forward end to the main frame,
   a second raking frame disposed below the main frame,
   means hingedly attaching said second raking frame as its forward end to the main frame rearwardly of said first raking frame,
   both of said first and second raking frames having length, width and thickness, and said hinged attachments thereof elevated from the forward end of their respective raking frames a distance greater than the thickness of the frames,
   a plurality of tines secured to and depending from said first and second raking frames in spaced and staggered relation to each other,
   a first driven shaft journalled in bearings mounted at the forward end of the main frame,
   said shaft adapted for direct connection to a power take-off shaft of a towing vehicle,
   a second driven shaft rotatably mounted in bearings superimposed upon said main frame in an elevated position relative thereto,
   a unitary driving connection between said first driven shaft and said second driven shaft,
   cam means secured to said second driven shaft with their lobe portions diametrically opposed about said second driven shaft,
   connecting rods operatively interconnecting said cam means and said first and second raking frames,
   said cam means being normally at a mid-point between their highest and lowest operative positions when said raking frames are horizontal to the ground,
   said connecting rods being of sufficient length to drive the raking frames below a horizontal position upon operation of said cam means to impart forward rocking motion to the raking frames about their said elevated hinged attachment and thereby intermittent progressive penetration of said tines into the ground and a forward tilting motion thereto during such penetration while the implement is in forward motion.

References Cited in the file of this patent

UNITED STATES PATENTS

| 396,441 | Taylor | Jan. 22, 1889 |
| 1,723,943 | Kropp | Aug. 6, 1929 |
| 2,935,140 | Talbert | May 3, 1960 |

FOREIGN PATENTS

| 227,833 | Germany | Oct. 29, 1910 |